(12) United States Patent
McBride et al.

(10) Patent No.: US 7,991,736 B2
(45) Date of Patent: *Aug. 2, 2011

(54) ARTICLE OF MANUFACTURE AND SYSTEM FOR AUTONOMIC DATA CACHING AND COPYING ON A STORAGE AREA NETWORK AWARE FILE SYSTEM USING COPY SERVICES

(75) Inventors: Gregory Edward McBride, Tucson, AZ (US); Cuong Minh Le, Tucson, AZ (US); David Michael Shackelford, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 458 days.

This patent is subject to a terminal disclaimer.

(21) Appl. No.: 12/256,251

(22) Filed: Oct. 22, 2008

(65) Prior Publication Data
US 2009/0043980 A1 Feb. 12, 2009

Related U.S. Application Data (63) Continuation of application No. 10/993,801, filed on Nov. 19, 2004, now Pat. No. 7,464,124.

(51) Int. Cl.
*G06F 12/16* (2006.01)
*G06F 12/00* (2006.01)
*G06F 13/00* (2006.01)

(52) U.S. Cl. ......................... 707/612; 707/616; 711/162

(58) Field of Classification Search ........................ None
See application file for complete search history.

(56) References Cited

U.S. PATENT DOCUMENTS

| | | | |
|---|---|---|---|
| 5,077,736 | A | 12/1991 | Dunphy, Jr. et al. |
| 5,155,835 | A | 10/1992 | Belsan |
| 5,351,246 | A | 9/1994 | Blaum et al. |
| 5,381,545 | A | 1/1995 | Baker et al. |
| 5,392,244 | A | 2/1995 | Jacobson et al. |
| 5,430,855 | A | 7/1995 | Walsh et al. |

(Continued)

FOREIGN PATENT DOCUMENTS
EP 1170657 A2 9/2002

OTHER PUBLICATIONS
First Office Action for U.S. Appl. No. 10/993,801, dated Apr. 23, 2007, 12 pgs.

(Continued)

*Primary Examiner* — don wong
*Assistant Examiner* — Belinda Xue
(74) *Attorney, Agent, or Firm* — Konrad Raynes and Victor LLP; Janaki K. Davda (57) ABSTRACT

Techniques are provided for processing a request. When the request is to read a data unit, information regarding the closest physical block locations is returned. When the request is to write to the data unit, information regarding one or more source block locations is returned, wherein the write is applied to one or more source blocks of the data unit. When a number of requests for the data unit exceed a threshold level and at least one quality of a service policy is not being met, a copy of the one or more source blocks of the data unit is created at a location selected based on proximity to at least one client computer from which the number of requests are high.

9 Claims, 8 Drawing Sheets

U.S. PATENT DOCUMENTS

| | | | |
|---|---|---|---|
| 5,557,775 | A | 9/1996 | Shedletsky |
| 5,649,185 | A | 7/1997 | Antognini et al. |
| 5,787,247 | A | 7/1998 | Norin et al. |
| 5,991,813 | A | 11/1999 | Zarrow |
| 6,006,264 | A | 12/1999 | Colby et al. |
| 6,073,209 | A | 6/2000 | Bergsten |
| 6,105,113 | A | 8/2000 | Schimmel |
| 6,163,856 | A | 12/2000 | Dion et al. |
| 6,182,122 | B1 | 1/2001 | Berstis |
| 6,189,079 | B1 | 2/2001 | Micka et al. |
| 6,282,670 | B1 | 8/2001 | Rezaul Islam et al. |
| 6,304,980 | B1 | 10/2001 | Beardsley et al. |
| 6,314,503 | B1 | 11/2001 | D'Errico et al. |
| 6,378,038 | B1 | 4/2002 | Richardson et al. |
| 6,460,055 | B1 | 10/2002 | Midgley et al. |
| 6,484,204 | B1 | 11/2002 | Rabinovich |
| 6,496,944 | B1 | 12/2002 | Hsiao et al. |
| 6,526,418 | B1 | 2/2003 | Midgley et al. |
| 6,530,004 | B1 | 3/2003 | King et al. |
| 6,582,474 | B2 | 6/2003 | LaMarca et al. |
| 6,598,174 | B1 | 7/2003 | Parks et al. |
| 6,640,291 | B2 | 10/2003 | Fujibayashi et al. |
| 6,647,474 | B2 | 11/2003 | Yanai et al. |
| 6,661,901 | B1 | 12/2003 | Svean et al. |
| 6,718,447 | B2 | 4/2004 | Cochran |
| 6,745,206 | B2 | 6/2004 | Mandler et al. |
| 6,745,209 | B2 | 6/2004 | Holenstein et al. |
| 6,754,699 | B2 | 6/2004 | Swildens et al. |
| 6,772,315 | B1 | 8/2004 | Perego |
| 6,779,078 | B2 | 8/2004 | Murotani et al. |
| 6,779,082 | B2 | 8/2004 | Burger et al. |
| 6,804,690 | B1 | 10/2004 | Dysert et al. |
| 6,820,217 | B2 | 11/2004 | Mock et al. |
| 6,832,253 | B1 | 12/2004 | Auerbach |
| 6,876,656 | B2 | 4/2005 | Brewer et al. |
| 6,880,059 | B2 | 4/2005 | Mizuno et al. |
| 6,895,467 | B2 | 5/2005 | Lubbers et al. |
| 6,904,046 | B2 | 6/2005 | Benayoun et al. |
| 6,928,513 | B2 | 8/2005 | Lubbers et al. |
| 6,957,433 | B2 | 10/2005 | Umberger et al. |
| 6,959,360 | B2 | 10/2005 | Murotani et al. |
| 6,985,995 | B2 | 1/2006 | Holland et al. |
| 7,107,483 | B2 | 9/2006 | Duncan et al. |
| 7,165,096 | B2 | 1/2007 | Soltis |
| 7,167,960 | B2 | 1/2007 | Kodama et al. |
| 7,203,732 | B2 | 4/2007 | McCabe et al. |
| 7,383,406 | B2 | 6/2008 | McBride et al. |
| 2001/0044879 | A1* | 11/2001 | Moulton et al. ............. 711/114 |
| 2001/0047448 | A1 | 11/2001 | Sueoka et al. |
| 2002/0016827 | A1* | 2/2002 | McCabe et al. ............... 709/213 |
| 2002/0103969 | A1 | 8/2002 | Koizumi et al. |
| 2002/0124085 | A1 | 9/2002 | Matsuda et al. |
| 2002/0133491 | A1 | 9/2002 | Sim et al. |
| 2002/0138347 | A1 | 9/2002 | Sakata |
| 2002/0188697 | A1 | 12/2002 | O'Connor |
| 2003/0046369 | A1 | 3/2003 | Sim et al. |
| 2003/0182421 | A1 | 9/2003 | Faybishenko et al. |
| 2003/0225801 | A1 | 12/2003 | Devarakonda et al. |
| 2004/0002934 | A1 | 1/2004 | Taulbee et al. |
| 2004/0153727 | A1 | 8/2004 | Hicken et al. |
| 2004/0225719 | A1 | 11/2004 | Kisley et al. |
| 2005/0193239 | A1 | 9/2005 | Shackelford |
| 2006/0112242 | A1 | 5/2006 | McBride et al. |

OTHER PUBLICATIONS

Final Office Action for U.S. Appl. No. 10/993,801, dated Sep. 7, 2007, 41 pgs.

Third Office Action for U.S. Appl. No. 10/993,801, dated Feb. 28, 2008, 18 pgs.

Office Action for U.S. Appl. No. 10/993,801, dated Apr. 11, 2008, 14 pgs.

Notice of Allowance for U.S. Appl. No. 10/993,801, dated Jul. 14, 2008, 14 pgs.

Response to First Office Action for U.S. Appl. No. 10/993,801, dated Jun. 27, 2007, 14 pgs.

Response to Final Office Action for U.S. Appl. No. 10/993,801, dated Nov. 12, 2007, 12 pgs.

Response to Third Office Action for U.S. Appl. No. 10/993,801, dated May 28, 2008, 8 pgs.

Supplemental Notice of Allowance for U.S. Appl. No. 10/993,801, dated Aug. 13, 2008, 6 pgs.

International Search Report and Written Opinion dated Jun. 23, 2006 for Application No. PCT/EP2005/056059, filed Nov. 18 2005.

European Office Action, May 2, 2008, for European Application No. 05 817 273.5-1245, 7 pp.

Response to Examination Report for Application 05817273.5-1245, Aug. 14, 2008, 4 pp.

U.S. Appl. No. 12/104,288, filed Apr. 16, 2008, entitled Application Transparent Autonomic Availability on a Storage Area Network Aware File System, invented by Gregory Edward McBride.

U.S. Appl. No. 12/238,187, filed Sep. 9, 2008, entitled System and Article of Manufacture for Transparent Autonomic Data Replication Improving Access Performance for a Storage Area Network Aware File System, invented by Gregory Edward McBride.

European Patent Office, Communication Pursuant to Article 94(3) EPC, for application 05 817 273.5-1245, dated Jun. 29, 2009, 7 pgs.

* cited by examiner

ARTICLE OF MANUFACTURE AND SYSTEM FOR AUTONOMIC DATA CACHING AND COPYING ON A STORAGE AREA NETWORK AWARE FILE SYSTEM USING COPY SERVICES

CROSS-REFERENCE TO RELATED APPLICATIONS

This application is a continuation of and claims the benefit of "AUTONOMIC DATA CACHING AND COPYING ON A STORAGE AREA NETWORK AWARE FILE SYSTEM USING COPY SERVICES", having application Ser. No. 10/993,801, filed Nov. 19, 2004, the entire contents of which is incorporated herein by reference.

BACKGROUND

1. Field

Implementations of the invention relate to autonomic data caching and copying on a Storage Area Network (SAN) aware file system using copy services.

2. Description of the Related Art

Computing systems often include one or more host computers ("hosts") for processing data and running application programs, direct access storage devices (DASDs) for storing data, and a storage controller for controlling the transfer of data between the hosts and the DASD. Storage controllers, also referred to as control units or storage directors, manage access to a storage space comprised of numerous hard disk drives, otherwise referred to as a Direct Access Storage Device (DASD). Hosts may communicate Input/Output (I/O) requests to the storage space through the storage controller.

Storage controllers may provide copy services. With the copy services, data on one storage device, such as a DASD, may be copied to the same or another storage device so that access to data volumes can be provided from two different devices or to have a backup copy.

International Business Machines Corporation (IBM), the assignee of the subject patent application, provides remote copy services for maintaining remote copies of data at a secondary storage device, including extended remote copy (XRC) and peer-to-peer remote copy (PPRC). These systems provide techniques for recovering data updates between a last, safe backup and a system failure. Such data shadowing systems can also provide an additional remote copy for non-recovery purposes, such as local access at a remote site.

Another example of a copy service is a point-in-time copy, which involves physically copying all the data from source volumes to target volumes so that the target volume has a copy of the data as of a point-in-time. A point-in-time copy can also be made by logically making a copy of the data and then only copying data over when necessary, in effect deferring the physical copying, and this is referred to as an "instant virtual copy" operation or "fast replicate function."

Instant virtual copy operations work by modifying metadata such as relationship tables or pointers to treat a source data object as both the original and copy. In response to a host's copy request, the storage subsystem immediately reports creation of the copy without having made any physical copy of the data. Only a "virtual" copy has been created, and the absence of an additional physical copy is completely unknown to the host. The host or storage subsystem may even proceed to create an actual, physical copy of the original data object during background processing, or at another time.

One such instant virtual copy operation is known as a FlashCopy® operation. Further details of the FlashCopy® operations are described in the commonly assigned U.S. Pat. No. 6,661,901, issued on Aug. 26, 2003, entitled "Method, System, and Program for Maintaining Electronic Data as of a Point-in-Time", which patent application is incorporated herein by reference in its entirety.

Some conventional systems provide a global file system. That is, server computers may be connected by a network to storage controllers storing files. A file system may include files across the server computers. A file system may be described as a system that an operating system or program uses to organize and keep track of files. For example, a hierarchical file system is one that uses directories to organize files into a tree structure. Thus, a file system includes files along with the ability to access (e.g., store, retrieve, modify, and delete) the files. File access times and speeds with a global file system across long distances may be slow due to the distance that data must travel for a file access. That is, when a request for data is sent to a server computer that is far from the computer generating the request, it may take some time to access the file and return the requested data.

Some conventional systems cache data locally, by geography, using replicated server computers. In particular, a number of server computers are connected together over a large geographic region (e.g., across different states within the United States), and data is replicated at each of the servers. Then, requests for data may be routed to the server computer geographically closest to the computer from which the request was generated. However, it is often difficult to maintain the copies of the data in synch.

Therefore, there is a continued need in the art for improved file access.

SUMMARY OF THE INVENTION

Provided are an article of manufacture, system, and method for processing a request. When the request is to read a data unit, information regarding the closest physical block locations is returned. When the request is to write to the data unit, information regarding one or more source block locations is returned, wherein the write is applied to one or more source blocks of the data unit. When a number of requests for the data unit exceed a threshold level and at least one quality of a service policy is not being met, a copy of the one or more source blocks of the data unit is created at a location selected based on proximity to at least one client computer from which the number of requests are high.

BRIEF DESCRIPTION OF THE DRAWINGS

Referring now to the drawings in which like reference numbers represent corresponding parts throughout.

DETAILED DESCRIPTION OF THE IMPLEMENTATIONS

In the following description, reference is made to the accompanying drawings which form a part hereof and which illustrate several implementations of the invention. It is understood that other implementations may be utilized and structural and operational changes may be made without departing from the scope of implementations of the invention.

Figure 1:
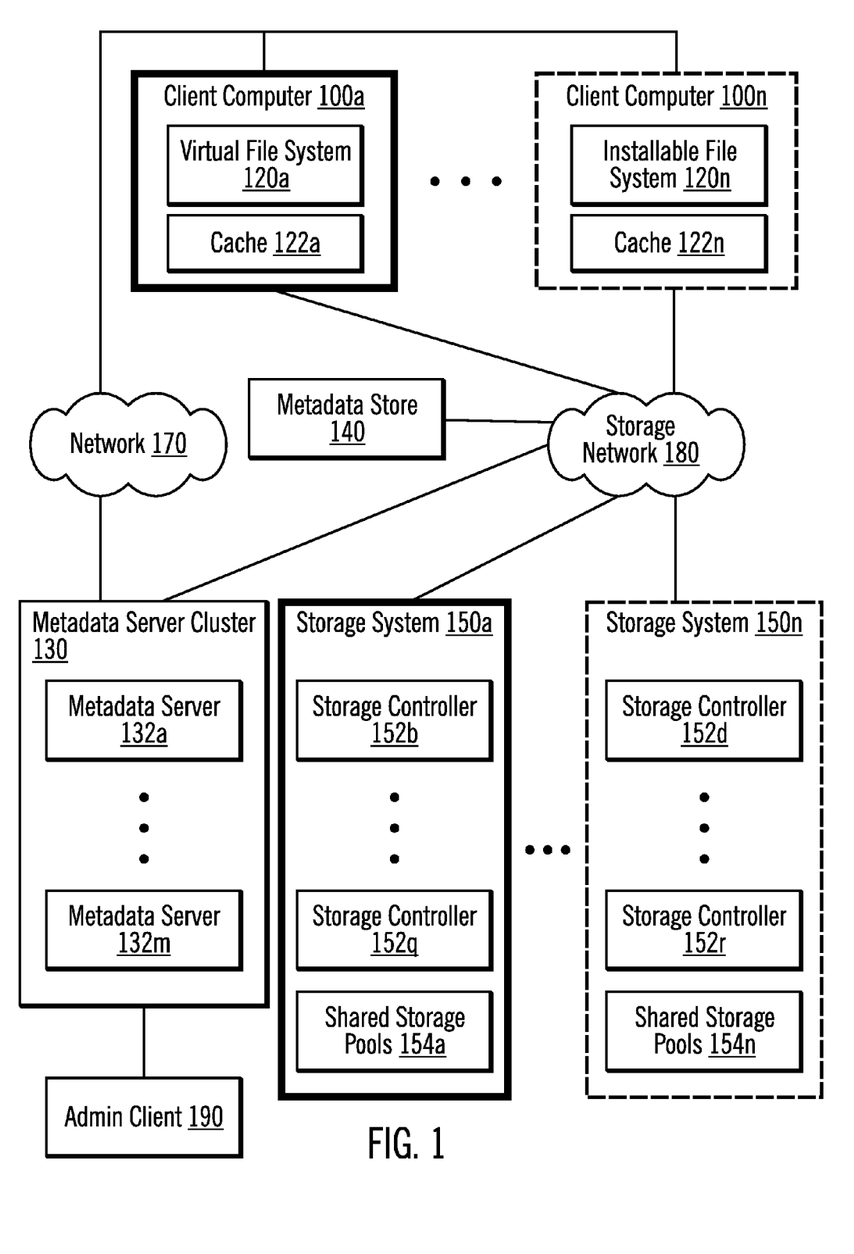
FIG. 1 illustrates a computing environment in which certain implementations of the invention are implemented.

FIG. 1 illustrates, in a block diagram, a computing environment in accordance with certain implementations of the invention. One or more client computers 100a . . . 100n are connected via a network 170 to a metadata server cluster 130 and via a storage network 180 to storage systems 150a . . . 150n. The storage network 180 provides direct data transfer between client computers 100a . . . 100n and storage systems 150a . . . 150n. Storage system 150a is considered to be "near" storage to client computer 100a, and storage system 150n is considered to be "remote" storage to client computer 100a. Likewise, storage system 150n is considered to be "near" storage to client computer 100n, and storage system 150a is considered to be "remote" storage to client computer 100n. The term "near" storage may be described as storage that is geographically closer a client computer than "remote" storage is to that client computer. Each client computer 100a . . . 100n has an associated near storage. The near storage includes copies of data units (e.g., files) for source blocks (i.e., the original blocks that form data units and that may be copied to near storage) stored in remote storage. A set of related source blocks may be described as a data unit (e.g., a file).

Each client computer 100a . . . 100n includes a file system 120a . . . 120n with a cache 122a . . . 122n, respectively. The client computers 100a . . . 100n may run any operating system 108a . . . 108n (FIG. 2), such as an AIX® operating system, a Linux® operating system, a Windows® 2000 operating system, a Windows® XP operating system, a Solaris® operating system, a UNIX operating system or HP-UX operating system. The client computers 100a . . . 100n may also be referred to as "storage clients".

The file system 120a . . . 120n may be called an installable file system (IFS) on client computers running certain operating systems (e.g., a Windows® 2000 operating system, a Windows® XP operating system, or HP-UX operating system) and may be called a virtual file system (VFS) on client computers running certain other operating systems (e.g., AIX® operating system, Linux® operating system or a Solaris® operating system). The file systems 120a . . . 120n at the client computers 100a . . . 100n may be referred to as storage controller client file systems.

The file systems 120a . . . 120n direct metadata operations to the metadata server cluster 130 and direct data operations to storage systems 150a . . . 150n attached to a high-speed storage network 180. The file systems 120a . . . 120n make the metadata that is visible to each client computer 100a . . . 100n operating system, as well as any application programs that a client computer 100a . . . 100n runs, look identical to metadata read from a native, locally-attached file system. The file systems 120a . . . 120n support locking and caching of data.

Each client computer 100a . . . 100n may comprise any computing device known in the art, such as a server, mainframe, workstation, personal computer, hand held computer, laptop telephony device, network appliance, etc.

The metadata server cluster 130 includes metadata servers 132a . . . 132m. An admin client computer 190 may be optionally connected to metadata server cluster 130 to allow an administrator to submit commands directly to one or more metadata servers 132a . . . 132m. Each metadata server 132a . . . 132m implements a SAN file system catalog that stores mappings between files and source blocks on storage devices making up the file. The mappings are stored in the metadata store 140.

A metadata store is connected to the storage network 180. The metadata servers 132a . . . 132m maintain data in the metadata store 140 including, for example, locations of data in storage systems 150a . . . 150n and how frequently data is accessed by each client computer 100a . . . 100n.

The storage systems 150a . . . 150n each include one or more storage controllers 152b . . . 152q, 152d . . . 152r and include shared storage pools 154a . . . 154n for storing data (e.g., files).

A SAN may be described as a high-speed sub-network of shared storage devices. A storage device may be described as any component that is capable of storing data. Multiple metadata servers 132a . . . 132m have access to storage devices in the storage systems 150a . . . 150n. A SAN aware file system may be described as including the metadata server cluster 130, the metadata store 140, the storage systems 150a . . . 150n, the storage network 180, and the virtual and installable file systems 120a . . . 120n. Thus, a unified file system in a clustered environment is illustrated in FIG. 1.

Each metadata server 132a . . . 132m may be described as a sub-network of shared storage devices with a technique for organizing and keeping track of data in a SAN aware file system. Each metatdata server 132a . . . 132m may copy data units from remote storage to one or more of the multiple near storages. Each metadata server 132a . . . 132m is able to keep track of multiple references to data source blocks and copies of the data source blocks. For ease of reference, the copies of the data source blocks will be referred to as "copy blocks". A set of related source blocks may be described as a data unit (e.g., a file). The metadata server 132a . . . 132m also tracks the location of each near storage and each client computer 100a . . . 100n.

The networks 170 and 180 may each comprise any type of network, such as, for example, a Storage Area Network (SAN), a Local Area Network (LAN), Wide Area Network (WAN), the Internet, an Intranet, etc.

Figure 2:
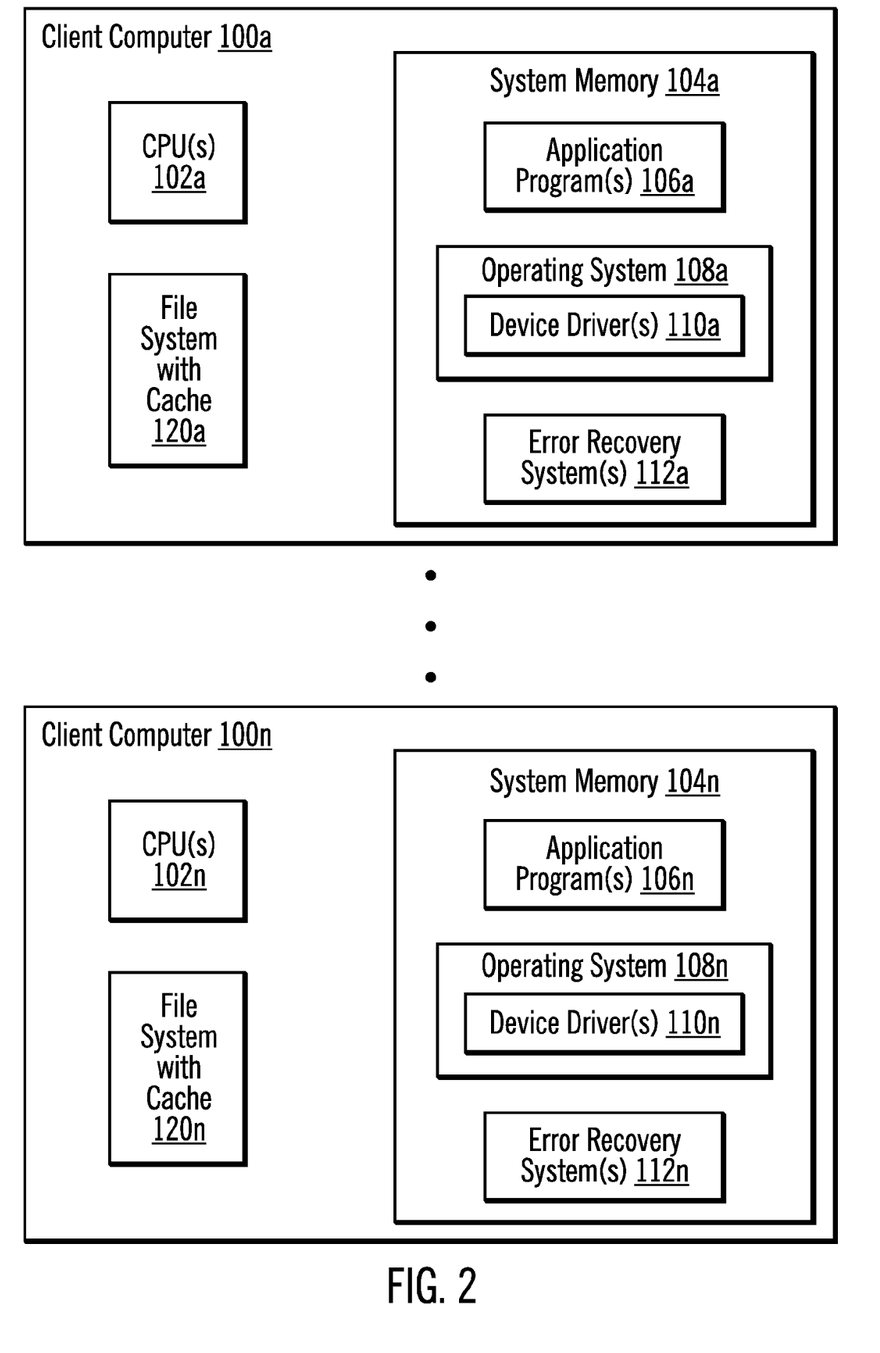
FIG. 2 illustrates client computers in accordance with certain implementations of the invention.

FIG. 2 illustrates client computers 100a . . . 100n in accordance with certain implementations of the invention. Each client computer 100a . . . 100n includes one or more Central Processing Units (CPU) 102a . . . 102n and a system memory 104a . . . 104n, which may be implemented in volatile and/or non-volatile devices. One or more client applications 106a . . . 106n, an operating system 108a . . . 108n, and one or more error recovery systems 112a . . . 112n may be stored in the system memory 104a. The operating system 108a . . . 108n may include one or more device drivers 110a . . . 110n. The error recovery systems 112a . . . 112n and device drivers 110a . . . 110n may be used when switching indicators from one set of blocks to another (e.g., from source blocks to target blocks) in order to ensure a data consistent switch. The switching of indicators is further described in U.S. patent application Ser. No. 10/994,149, entitled "Application Transparent Autonomic Availability On A Storage Area Network Aware File System", by Gregory E. McBride et. al., with client docket number SJO920030071US1, on Nov. 19, 2004, which is incorporated herein by reference in its entirety. Since I/O may be occurring in a continuous stream, the metadata server 132a . . . 132m and/or copy service 158b . . . 158q, 158d . . . 158r (FIG. 5) may instruct the storage controller 152b . . . 152q, 152d . . . 152r to return an error indication at the moment the blocks are switched to the new blocks to use. This will cause the error recovery system 112a . . . 112n and/or the device driver 110a ... 110n to perform a retry operation, and as part of the retry operation, the mapping of local (virtual) block addresses to physical storage is updated. The next I/O then proceeds to the new location of the data.

In normal I/O systems, when a permanent error is detected, the device driver 110a ... 110n and/or error recovery system 112a ... 112n returns an error indication to the requesting program. This normally results in an abnormal termination of the application program, which would result in an application outage. In implementations of the invention, the error recovery system 112a ... 112n performs additional processing. In particular, initially, an error is returned from a device performing an I/O operation. The error recovery system 112a ... 112n determines whether the device is a virtual device being managed by a SAN aware file system. If the virtual device is not being managed by SAN aware file system, the error is returned to the I/O request for action. If the virtual device is being managed by a SAN aware file system, the error recovery system 112a ... 112n notifies the metadata server 132a ... 132m or notifies the client computer 100a ... 100n, which then notifies the metadata server 132a ... 132m, that an error has occurred. The error recovery system 112a ... 112n waits for a policy decision to be made on redirecting I/O. The metadata server 132a ... 132m (or other policy engine) decides whether to switch indicators to data, which data to switch to, and performs the switch operation. The client computer 100a ... 100n is updated with the new mapping, and notifies the error recovery system 112a ... 112n that its wait is over. If the data was remapped, the error recovery system 112a ... 112n retries an operation using the new address. If the data was not remapped, the error recovery system 112a ... 112n returns an error. In alternative implementations, the client computer 100a ... 100n may be aware of whether the new copy of the data is writeable or not, and the error recovery system 112a ... 112n may report an error if the request is for a write and the data was mapped to a read-only location.

Figure 3:
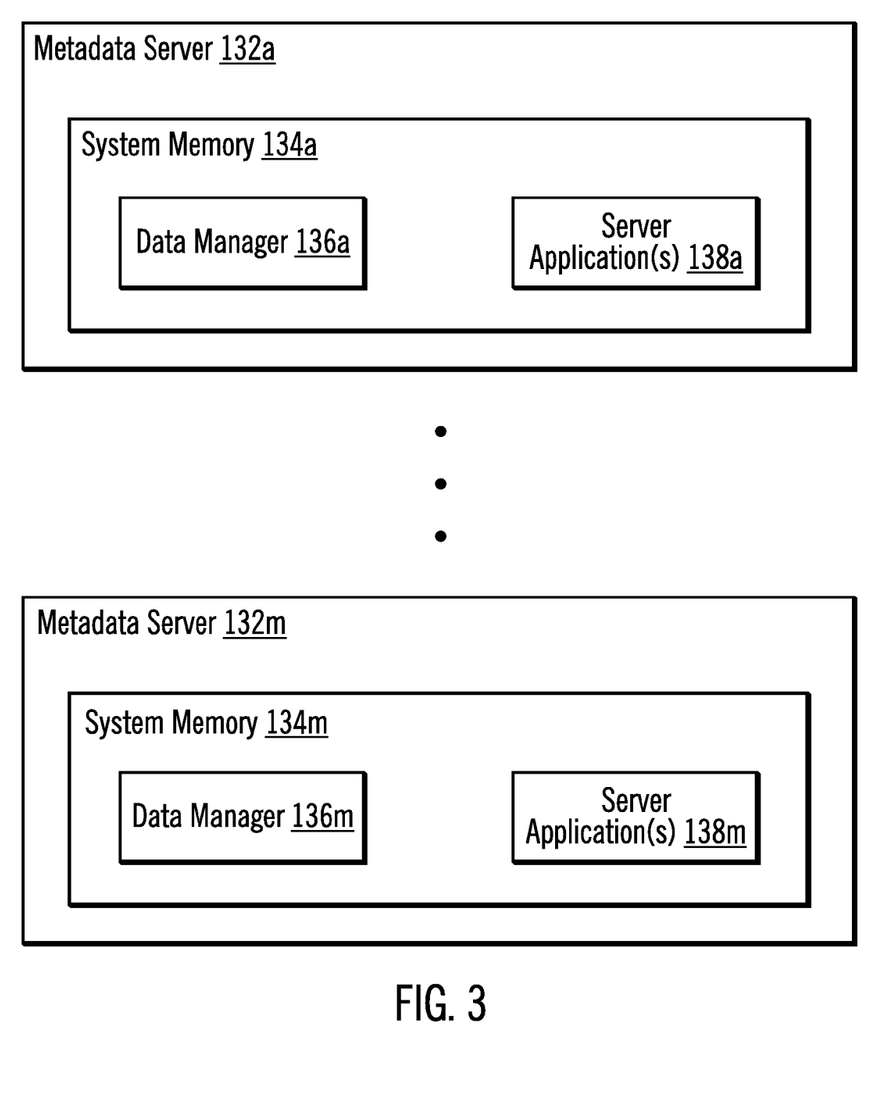
FIG. 3 illustrates metadata servers in accordance with certain implementations of the invention.

FIG. 3 illustrates metadata server 132a ... 132m in accordance with certain implementations of the invention. Each metadata server 132a ... 132m includes system memory 134a ... 134m, which may be implemented in volatile and/or non-volatile devices. Each system memory 134a ... 134m includes a data system manager 136a ... 136m and one or more server applications 138a ... 138m.

Each metadata server 132a ... 132m is able to keep track of multiple references to data source blocks and copies of the data source blocks. For ease of reference, the copies of the data source blocks will be referred to as "target blocks." A set of related source blocks may be described as a data unit (e.g., a file). Each metadata server 132a ... 132m also tracks the location of each client computer 100a ... 100n.

Each metadata server 132a ... 132m acts as a catalogue for the SAN aware file system by storing mappings between files and source and target blocks making up the file. Each metadata server 132a ... 132m also works with copy services 158b ... 158q, 158d ... 158r (FIG. 5) provided, for example, by the storage systems 150a ... 150n. The copy services 158b ... 158q, 158d ... 158r allow for policy based copy services, such as point-in-time copy services, continues copy services, etc. Each metadata server 132a ... 132m may work with other application programs or SAN elements to execute the copy services. That is, the copy services may be provided in various forms, such as in the form of an application executing on a server computer or in a SAN fabric element.

As data is copied via the copy services, each metadata server 132a ... 132m tracks the relationship between the source blocks and copies of those blocks, regardless of the type of copy service (e.g., point-in-time copy service or continuous copy service). Moreover, each metadata server 132a ... 132m is able to swap the reference for a file's blocks from the source blocks to a copy of the source blocks (i.e., "target blocks"), which makes the target blocks the new source blocks.

Figure 4:
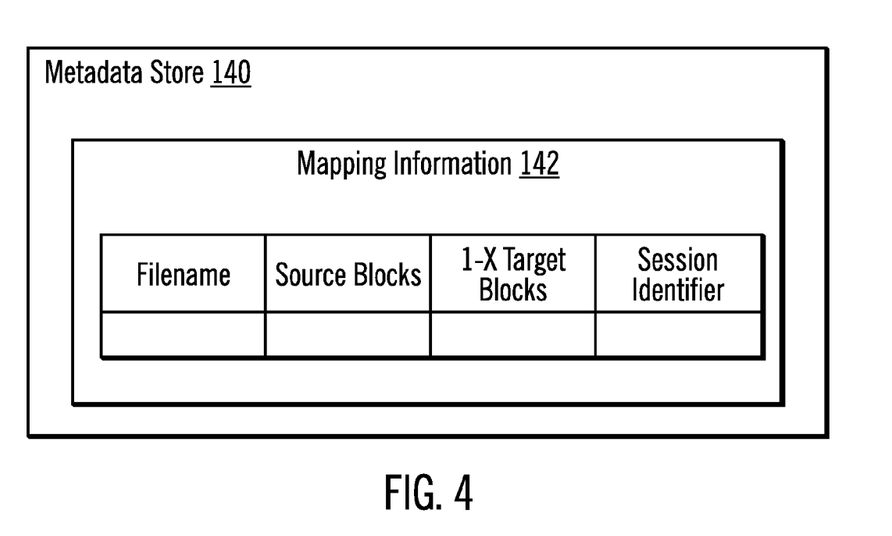
FIG. 4 illustrates a metadata store in accordance with certain implementations of the invention.

FIG. 4 illustrates a metadata store 140 in accordance with certain implementations of the invention. Metadata store 140 includes mapping information 142. The mapping information includes a table with rows associated with a file. For each file, the mapping information includes a filename, source blocks that indicate locations of source blocks for the file, 1-X target blocks, and a session identifier. The 1-X target blocks represent one or more copies of source blocks and provide locations of copies of the source blocks. A session is a set of copy service relationships that represent a set of data being maintained in a consistent state. Each target copy of a file (made up of target blocks) may share a session or have its own session. Additionally, the metadata store 140 may store information that describes the locations of data units, how frequently each data unit is accessed by each client computer 100a ... 100n, etc.

Figure 5:
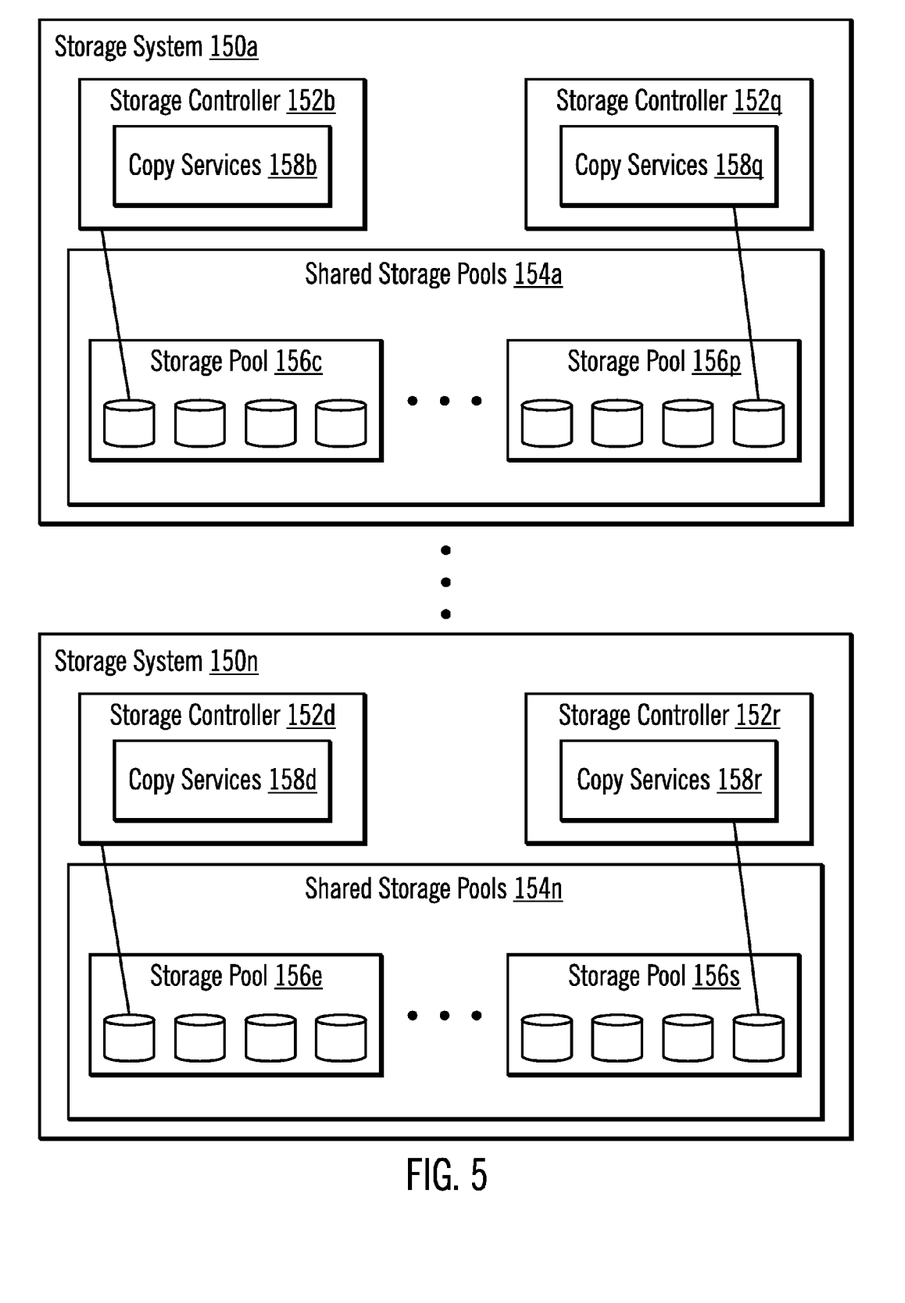
FIG. 5 illustrates storage systems in accordance with certain implementations of the invention.

FIG. 5 illustrates storage systems 150a ... 150n in accordance with certain implementations of the invention. The storage system 150a provides one or more storage controllers 152b ... 152q and shared storage pools 154a. Each storage controller 152b ... 152q provides copy services 158b ... 158q. Each shared storage pool 156c ... 156p provides shared storage devices. Similarly, the storage system 150n provides one or more storage controllers 152d ... 152r and shared storage pools 154n. Each storage controller 152d ... 152r provides copy services 158d ... 158r. Each shared storage pool 156e ... 156s provides shared storage devices. In certain implementations, storage devices (e.g., LUNs) are grouped into storage pools to allow policy-based management based on service class attributes such as performance and reliability. A LUN may be described as a unique number that may identify a specific disk and is typically used to refer to a disk having that LUN. In certain implementations, each storage controller 152b ... 152q and 152 ... 152r is connected to a storage pool or one or more storage devices (e.g., LUNs) within a storage pool. The storage pools 156c ... 156p and 156e ... 156s may each include, for example, an array of storage devices, such as Direct Access Storage Devices (DASDs), Just a Bunch of Disks (JBOD), Redundant Array of Independent Disks (RAID), a virtualization device, etc.

Figure 6:
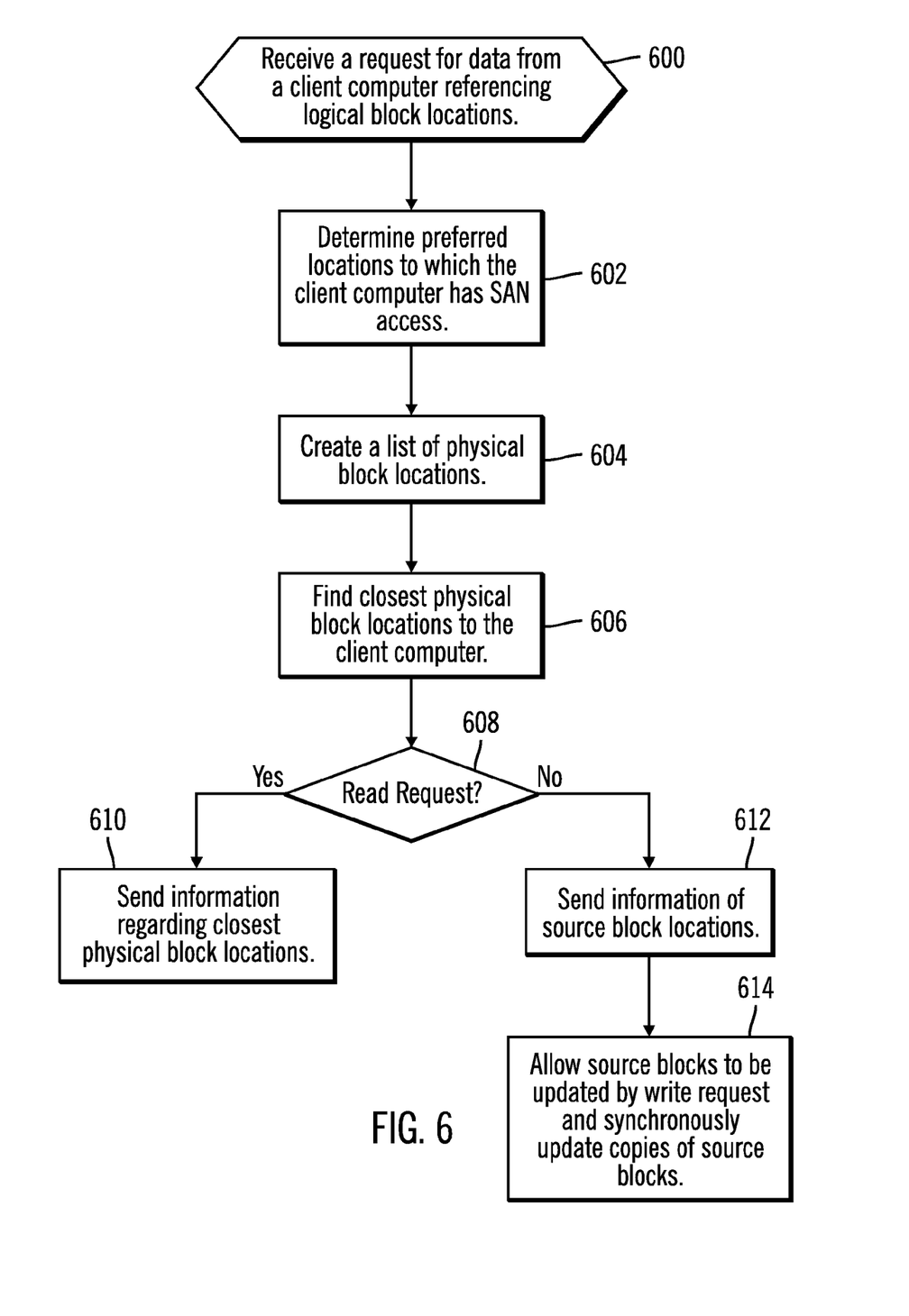
FIG. 6 illustrates logic for processing a read or write request in accordance with certain implementations of the invention.

FIG. 6 illustrates logic for processing a read or write request in accordance with certain implementations of the invention. Control begins at block 600 with a data system manager 136a ... 136m receiving a request for data from a client computer 100a ... 100n referencing logical block locations. In block 602, the data system manager 136a ... 136m determines locations of the data to which the client computer 100a ... 100n has SAN access. In particular, the client computer 100a ... 100n has access to multiple locations, and the data system manager 136a ... 136m determines these locations. Ultimately, the data system manager 136a ... 136m selects a location that is preferred for accessing the data. The location may be preferred based on various factors, such as the distance of the location from the client computer 100a ... 100n, the reliability of the location, etc.

In block 604, the data system manager 136a ... 136m creates a list of physical block locations for the requested data from the logical block locations. Multiple instances of a block of data may be stored to different storage areas, thus a logical block location referred to by the client computer 100a ... 100n may map to multiple different physical block locations.

For each logical block of data requested, the data system manager 136a . . . 136m determines a list of one or more physical block locations.

In block 606, the data system manager 136a . . . 136m finds the closest physical block locations to the client computer 100a . . . 100n. The closest physical block locations may reside in near storage connected to the client computer 100a . . . 100n from which the request was received or may be located in other near storages or in remote storage.

In block 608, the data system manager 136a . . . 136m determines whether the request is a read request. If so, processing continues to block 610, otherwise, processing continues to block 612. In block 610, the data system manager 136a . . . 136m sends information regarding the closest physical block locations (e.g., block locations in near storage). In certain implementations, one client computer 100a . . . 100n may be provided with information regarding physical block locations at another client computer 100a . . . 100n. In block 612, for write requests, the data system manager 136a . . . 136m sends information regarding the source block locations, which may be in remote storage. That is, read requests are performed against the closest copy blocks, while write requests are applied at the source blocks so that as writes occur, the source blocks are updated. In block, 614, the source blocks are updated by the write request, and the underlying copy services technology (e.g., copy services 158b . . . 158q, 158d . . . 158r) enables the source block to be synchronously copied to all copy blocks tracked by the metadata server 132a . . . 132m.

In this manner, a read to any of the copy blocks is consistent and cache coherent by relying on the underlying copy services technology. Also, since all writes are applied to the source blocks, copies made from the source blocks are consistent.

Figure 7:
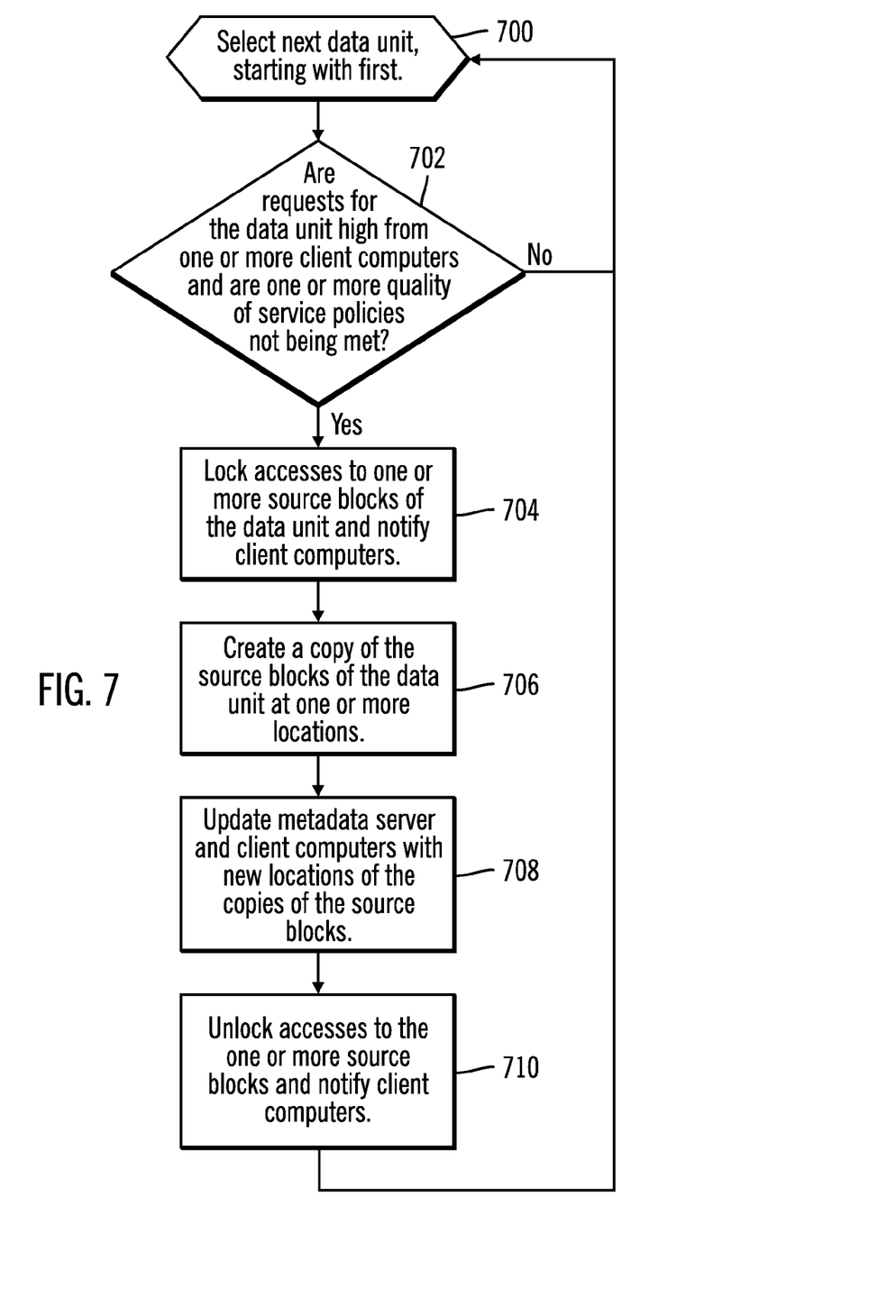
FIG. 7 illustrates logic performed by a data system manager in accordance with certain implementations of the invention.

FIG. 7 illustrates logic performed by the data system manager 136a . . . 136m in accordance with certain implementations of the invention. Control begins at block 700 with the data system manager 136a . . . 136m selecting a next data unit, starting with a first data unit. In certain implementations, the data system manager 136a . . . 136m loops through all data units, one by one, continuously, to reevaluate whether additional copies of each data unit should be made. In block 702, the data system manager 136a . . . 136m determines whether requests for the same data unit are high from one or more client computers 100a . . . 100n and whether one or more quality of service policies are not being met for the data unit. That is, the data system manager 136a . . . 136m determines where the data access is occurring and the frequency of the access. If the requests for the same data unit are low or the one or more quality of service policies are being met, then processing loops back to block 700 to select the next data unit, otherwise, processing continues to block 704. In block 704, the data system manager 136a . . . 136m locks accesses to one or more source blocks of the data unit and notifies client computers 100 that access to the source blocks of the data unit are locked. Subsequent accesses to the data unit are held until the lock is released. In block 706, the data system manager 136a . . . 136m creates a copy of the source blocks of the data unit at one or more additional locations. In block 708, the data system manager 136a . . . 136m updates the metadata server 132a . . . 132m and client computers 100a . . . 100n with new data locations of the copies of the source blocks (i.e., notifies client computers 100a . . . 100n that the locations of the affected source blocks of the data unit may have changed, causing client computers 100a . . . 100n to flush any cached copy of the source block locations which may be present). In block 710, the data system manager 136a . . . 136m unlocks accesses to the one or more source blocks and notifies client computers 100a . . . 100n that the data units are unlocked, which allows client computers 100a . . . 100n to continue data access, which will then be processed using the new data locations as created by the copy creation in block 706. This occurs without client application program awareness (e.g., without restart or migration). In certain implementations, the locations are selected based on their geographic distance to the client computers 100a . . . 100n that are making a high number of requests for the data unit. Thus, the metadata server 132a . . . 132m is capable of creating a copy of the data at the location closest to a client computer 100a . . . 100n based on detecting frequent access of the data. This results in increased performance with data currency.

Thus, certain implementations make use of and exploit the properties of a Storage Area Network (SAN) based file system (also referred to as SAN File System or SFS) and SAN based copy services. Implementations of the invention duplicate data units in storage at various locations to improve access (i.e., read) performance at remote locations. In particular, implementations of the invention may automatically copy data to remote locations to improve performance, and this duplication is transparent to application programs.

In certain implementations, locations have a single shared file system that they are using with a view of source data that provides the appearance that all of the data is being stored once. Also, the SAN data system makes the attached storage appear local to a user. A user is then able to access all of the locations to which the user has access rights as if they were local to the user.

IBM and AIX are registered trademarks or common law marks of International Business Machines Corporation in the United States and/or other countries. Windows is a registered trademark of Microsoft Corporation in the United States and/or other countries. Solaris is a registered trademark or common law mark of Sun Microsystems in the United States and/or other countries. Linux is a registered trademark of Linus Torvalds in the United States and/or other countries. HP-UX is an Open Group UNIX 95 branded product in the United States and/or other countries. UNIX is a registered trademark or common law mark of The Open Group in the United States and/or other countries.

Additional Implementation Details

The described implementations may be implemented as a method, apparatus or article of manufacture using programming and/or engineering techniques to produce software, firmware, hardware, or any combination thereof. The terms "article of manufacture" and "circuitry" as used herein refer to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which implementations are implemented may further be accessible through a transmission media or from a server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art.

The logic of FIGS. 6 and 7 describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 6 and 7 may be implemented in software, hardware, programmable and non-programmable gate array logic or in some combination of hardware, software, or gate array logic.

Figure 8:
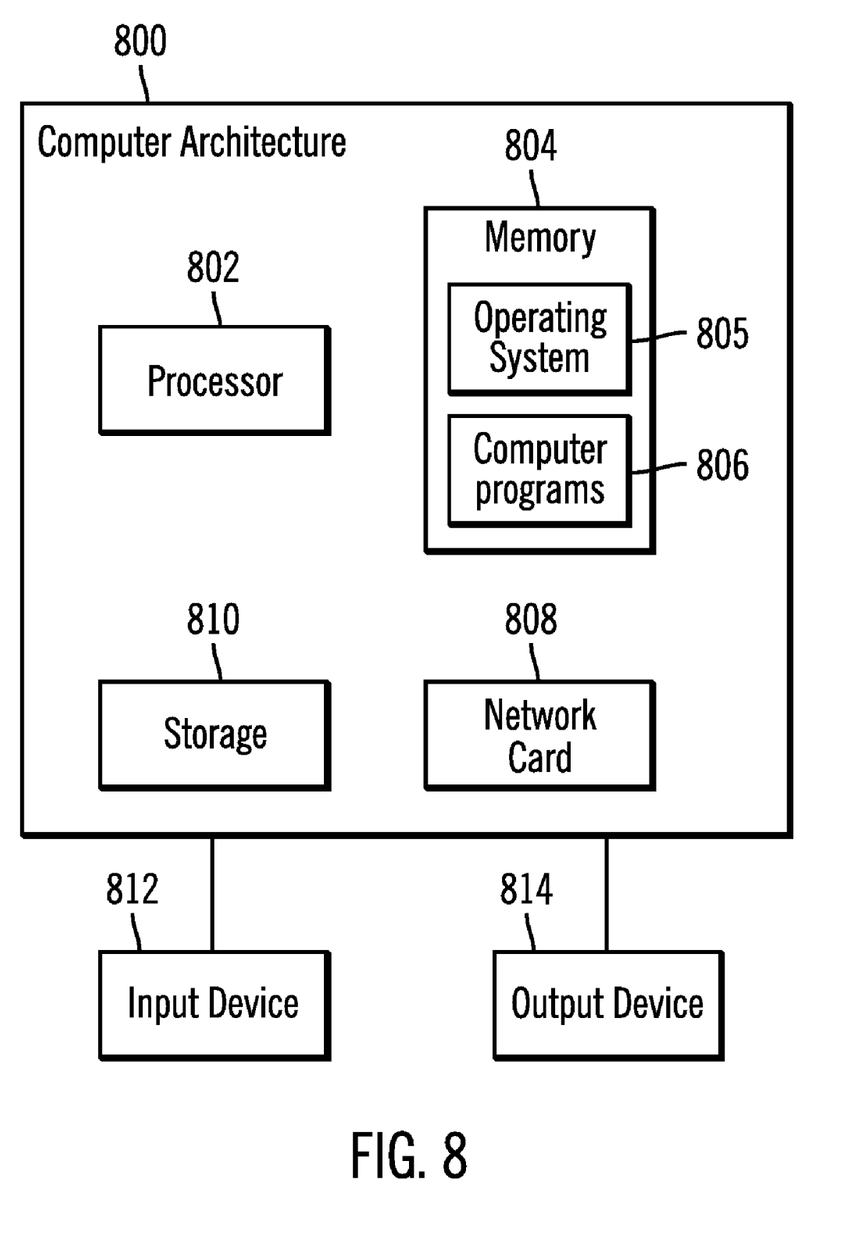
FIG. 8 illustrates an architecture of a computer system that may be used in accordance with certain implementations of the invention.

FIG. 8 illustrates an architecture 800 of a computer system that may be used in accordance with certain implementations of the invention. Client computers, server computers and/or SAN data systems may implement computer architecture 800. The computer architecture 800 may implement a processor 802 (e.g., a microprocessor), a memory 804 (e.g., a volatile memory device), and storage 810 (e.g., a non-volatile storage area, such as magnetic disk drives, optical disk drives, a tape drive, etc.). An operating system 805 may execute in memory 804. The storage 810 may comprise an internal storage device or an attached or network accessible storage. Computer programs 806 in storage 810 may be loaded into the memory 804 and executed by the processor 802 in a manner known in the art. The architecture further includes a network card 808 to enable communication with a network. An input device 812 is used to provide user input to the processor 802, and may include a keyboard, mouse, pen-stylus, microphone, touch sensitive display screen, or any other activation or input mechanism known in the art. An output device 814 is capable of rendering information from the processor 802, or other component, such as a display monitor, printer, storage, etc. The computer architecture 800 of the computer systems may include fewer components than illustrated, additional components not illustrated herein, or some combination of the components illustrated and additional components.

The computer architecture 800 may comprise any computing device known in the art, such as a mainframe, server, personal computer, workstation, laptop, handheld computer, telephony device, network appliance, virtualization device, storage controller, etc. Any processor 802 and operating system 805 known in the art may be used.

The foregoing description of implementations of the invention has been presented for the purposes of illustration and description. It is not intended to be exhaustive or to limit the implementations of the invention to the precise form disclosed. Many modifications and variations are possible in light of the above teaching. It is intended that the scope of the implementations of the invention be limited not by this detailed description, but rather by the claims appended hereto. The above specification, examples and data provide a complete description of the manufacture and use of the composition of the implementations of the invention. Since many implementations of the invention can be made without departing from the spirit and scope of the implementations of the invention, the implementations of the invention reside in the claims hereinafter appended or any subsequently-filed claims, and their equivalents.

What is claimed is:

1. An article of manufacture embodied as a computer readable storage medium including program logic for processing a request, wherein the program logic when executed causes operations to be performed, the operations comprising:

for a data unit, storing one or more source blocks of the data unit and copies of the one or more source blocks of the data unit in different locations in storage systems of a Storage Area Network (SAN) aware file system, wherein the SAN aware file system includes file systems located at each of one or more client computers and at least one metadata server, wherein each client computer has near storage for storing the copies of the one or more source blocks of the data unit, wherein, for each client computer, the near storage is geographically closer than remote storage, wherein the one or more source blocks are in remote storage, and wherein each metadata server keeps track of locations of the source blocks and the copies;

for each request to read the data unit, returning information regarding closest physical block locations, wherein the closest physical block locations are selected from physical block locations for the copies stored in the near storage and wherein the read is performed against one of the copies of the one or more source blocks of the data unit;

for each request to write to the data unit,
returning information regarding one or more source block locations stored in the remote storage, wherein the write is applied to the one or more source blocks of the data unit in the remote storage, wherein applying the write to the one or more source blocks of data enables additional copies of the source blocks of data to be consistent; and in response to applying the write to the one or more source blocks of the data unit in the remote storage, synchronously updating the copies of the one or more source blocks of the data unit in each near storage;

when a number of requests for the data unit exceed a threshold level and at least one quality of a service policy is not being met,
locking access to the one or more source blocks of the data unit;
notifying the client computers that access to the one or more source blocks of the data unit has been locked; and
creating a copy of the one or more source blocks of the data unit at a location selected based on proximity to at least one client computer from which the number of requests are high, wherein the number of requests for the data unit represents frequency of access of the data unit;

receiving the request for the data unit from a client computer referencing logical block locations, wherein the request is either the request to read or the request to write;

determining locations of the one or more source blocks and the copies in the storage systems to which the client computer has access;

creating a list of physical block locations for the determined locations from the logical block locations; and finding closest physical block locations to the client computer, wherein the closest physical block locations are copy block locations.

2. The article of manufacture of claim 1, wherein the operations further comprise:
in response to creating the copy of the one or more source blocks of the data unit,
unlocking access to the one or more source blocks of the data unit; and
notifying the client computers that access to the one or more source blocks of the data unit has been unlocked.

3. The article of manufacture of claim 1, wherein the operations further comprise:
in response to creating the copy of the one or more source blocks of the data unit, updating one or more metadata servers with new data locations for the copy of the one or more source blocks.

4. The article of manufacture of claim 1, wherein the operations further comprise:
in response to creating the copy of the one or more source blocks of the data unit, updating one or more client computers with new data locations for the copy of the one or more source blocks.

5. A system for processing a request, comprising:
circuitry embodied in hardware causing operations to be performed, the operations comprising:
for a data unit, storing one or more source blocks of the data unit and copies of the one or more source blocks of the data unit in different locations in storage systems of a Storage Area Network (SAN) aware file system, wherein the SAN aware file system includes file systems located at each of one or more client computers and at least one metadata server, wherein each client computer has near storage for storing the copies of the one or more source blocks of the data unit, wherein, for each client computer, the near storage is geographically closer than remote storage, wherein the one or more source blocks are in remote storage, and wherein each metadata server keeps track of locations of the source blocks and the copies;
for each request to read the data unit, returning information regarding closest physical block locations, wherein the closest physical block locations are selected from physical block locations for the copies stored in the near storage and wherein the read is performed against one of the copies of the one or more source blocks of the data unit;
for each request to write to the data unit,
returning information regarding one or more source block locations stored in the remote storage, wherein the write is applied to the one or more source blocks of the data unit in the remote storage, wherein applying the write to the one or more source blocks of data additional copies of the source blocks of data to be consistent; and
in response to applying the write to the one or more source blocks of the data unit in the remote storage, synchronously updating the copies of the one or more source blocks of the data unit in each near storage;
when a number of requests for the data unit exceed a threshold level and at least one quality of a service policy is not being met,
locking access to the one or more source blocks of the data unit;
notifying the client computers that access to the one or more source blocks of the data unit has been locked; and
creating a copy of the one or more source blocks of the data unit at a location selected based on proximity to at least one client computer from which the number of requests are high, wherein the number of requests for the data unit represents frequency of access of the data unit;
receiving the request for the data unit from a client computer referencing logical block locations, wherein the request is either the request to read or the request to write;
determining locations of the one or more source blocks and the copies in the storage systems to which the client computer has access;
creating a list of physical block locations for the determined locations from the logical block locations; and
finding closest physical block locations to the client computer, wherein the closest physical block locations are copy block locations.

6. The system of claim 5, wherein the operations further comprise:
in response to creating the copy of the one or more source blocks of the data unit,
unlocking access to the one or more source blocks of the data unit; and
notifying the client computers that access to the one or more source blocks of the data unit has been unlocked.

7. The system of claim 5, wherein the operations further comprise:
in response to creating the copy of the one or more source blocks of the data unit, updating one or more metadata servers with new data locations for the copy of the one or more source blocks.

8. The system of claim 5, wherein the operations further comprise:
in response to creating the copy of the one or more source blocks of the data unit, updating one or more client computers with new data locations for the copy of the one or more source blocks.

9. A system for processing a request, comprising:
for a data unit, means for storing one or more source blocks of the data unit and copies of the one or more source blocks of the data unit in different locations in storage systems of a Storage Area Network (SAN) aware file system, wherein the SAN aware file system includes file systems located at each of one or more client computers and at least one metadata server, wherein each client computer has near storage for storing the copies of the one or more source blocks of the data unit, wherein, for each client computer, the near storage is geographically closer than remote storage, wherein the one or more source blocks are in remote storage, and wherein each metadata server keeps track of locations of the source blocks and the copies;
for each request to read the data unit, means for returning information regarding closest physical block locations, wherein the closest physical block locations are selected from physical block locations for the copies stored in the near storage and wherein the read is performed against one of the copies of the one or more source blocks of the data unit;
for each request to write to the data unit,
means for returning information regarding one or more source block locations stored in the remote storage, wherein the write is applied to the one or more source blocks of the data unit in the remote storage, wherein applying the write to the one or more source blocks of data enables additional copies of the source blocks of data to be consistent; and means for, in response to applying the write to the one or more source blocks of the data unit in the remote storage, synchronously updating the copies of the one or more source blocks of the data unit in each near storage;

when a number of requests for the data unit exceed a threshold level and at least one quality of a service policy is not being met, means for locking access to the one or more source blocks of the data unit;

means for notifying the client computers that access to the one or more source blocks of the data unit has been locked; and means for creating a copy of the one or more source blocks of the data unit at a location selected based on proximity to at least one client computer from which the number of requests are high, wherein the number of requests for the data unit represents frequency of access of the data unit;

means for receiving the request for the data unit from a client computer referencing logical block locations, wherein the request is either the request to read or the request to write;

means for determining locations of the one or more source blocks and the copies in the storage systems to which the client computer has access;

means for creating a list of physical block locations for the determined locations from the logical block locations; and means for finding closest physical block locations to the client computer, wherein the closest physical block locations are copy block locations.

* * * * *